(12) United States Patent
Tran

(10) Patent No.: US 10,547,811 B2
(45) Date of Patent: Jan. 28, 2020

(54) SYSTEM AND METHOD(S) FOR PROCESSOR UTILIZATION-BASED ENCODING

(71) Applicant: Optimization Strategies, LLC, Tequesla, FL (US)

(72) Inventor: Bao Tran, Saratoga, CA (US)

(73) Assignee: Optimization Strategies, LLC, Tequesta, FL (US)

( * ) Notice: Subject to any disclaimer, the term of this patent is extended or adjusted under 35 U.S.C. 154(b) by 0 days.

(21) Appl. No.: 15/396,665

(22) Filed: Jan. 1, 2017

(65) Prior Publication Data

US 2018/0048858 A1    Feb. 15, 2018

Related U.S. Application Data

(63) Continuation of application No. 14/147,575, filed on Jan. 5, 2014, now Pat. No. 9,578,234, and a continuation of application No. 13/377,270, filed on Feb. 21, 2013, now Pat. No. 8,634,476, which is a
(Continued)

(51) Int. Cl.
| | |
|---|---|
| *H04N 5/232* | (2006.01) |
| *H04N 5/262* | (2006.01) |
| *H04N 5/265* | (2006.01) |
| *H04N 7/12* | (2006.01) |
| *H04N 7/15* | (2006.01) |
| *H04N 7/18* | (2006.01) |
| *G06F 3/00* | (2006.01) |
| *G06N 3/08* | (2006.01) |
| *G06N 3/063* | (2006.01) |
| *H04N 19/436* | (2014.01) |

(52) U.S. Cl.
CPC ............... *H04N 7/12* (2013.01); *G06F 3/005* (2013.01); *G06N 3/063* (2013.01); *G06N 3/084* (2013.01); *H04N 5/23222* (2013.01); *H04N 5/23229* (2013.01); *H04N 5/23238* (2013.01); *H04N 5/265* (2013.01); *H04N 5/2628* (2013.01); *H04N 7/15* (2013.01); *H04N 7/181* (2013.01); *H04N 19/436* (2014.11)

(58) Field of Classification Search
CPC ........ G06F 3/005; G06N 3/063; G06N 3/084; H04N 19/436; H04N 5/23222; H04N 5/23229; H04N 5/23238; H04N 5/2628; H04N 5/265; H04N 7/12; H04N 7/15; H04N 7/181
See application file for complete search history.

(56) References Cited

U.S. PATENT DOCUMENTS

| | | |
|---|---|---|
| 5,138,459 A | 8/1992 | Roberts et al. |
| 5,577,188 A | 11/1996 | Zhu |
| 5,604,817 A | 2/1997 | Massen et al. |

(Continued)

OTHER PUBLICATIONS

USB 3.0 Specification, USB Implementers Forum, Inc., Jun. 6, 2011, 531 pages.
(Continued)

*Primary Examiner* — Anner N Holder
(74) *Attorney, Agent, or Firm* — Smith Tempel Blaha LLC; Gregory Scott Smith

(57) ABSTRACT

A smart camera system is disclosed. The camera can work with cloud data storage systems and compute cloud. A call center can access the cloud to provide security monitoring services.

7 Claims, 13 Drawing Sheets

Related U.S. Application Data continuation of application No. 12/713,183, filed on Feb. 26, 2010, now Pat. No. 8,503,539.

(60) Provisional application No. 61/308,307, filed on Feb. 26, 2010.

(56) References Cited

U.S. PATENT DOCUMENTS

| | | | |
|---|---|---|---|
| 5,608,872 A | | 3/1997 | Schwartz et al. |
| 5,649,104 A | | 7/1997 | Carleton et al. |
| 5,761,419 A | | 6/1998 | Schwartz et al. |
| 5,819,038 A | | 10/1998 | Carleton et al. |
| 5,835,713 A | | 11/1998 | Fitzpatrick et al. |
| 5,917,544 A | | 6/1999 | Sobotta et al. |
| 6,005,981 A | | 12/1999 | Ng et al. |
| 6,535,238 B1 | * | 3/2003 | Kressin .................. H04N 7/141 |
| | | | 348/14.01 |
| 6,567,813 B1 | | 5/2003 | Zhu et al. |
| 6,601,087 B1 | | 7/2003 | Zhu et al. |
| 6,654,032 B1 | | 11/2003 | Zhu et al. |
| 6,763,501 B1 | | 7/2004 | Zhu et al. |
| 6,842,180 B1 | | 1/2005 | Maiyuran et al. |
| 7,015,954 B1 | | 3/2006 | Foote et al. |
| 7,285,004 B1 | | 10/2007 | Fukuda et al. |
| 7,342,668 B2 | | 3/2008 | Quadling et al. |
| 7,477,688 B1 | | 1/2009 | Zhang et al. |
| 7,584,475 B1 | * | 9/2009 | Lightstone ............... G06F 9/50 |
| | | | 348/14.01 |
| 7,940,705 B2 | | 5/2011 | Shaffer et al. |
| 8,019,151 B2 | | 9/2011 | Beilloin |
| 8,233,527 B2 | | 7/2012 | Schmit et al. |
| 8,270,840 B2 | | 9/2012 | Lai |
| 8,503,539 B2 | | 8/2013 | Tran |
| 8,634,476 B2 | | 1/2014 | Tran |
| 8,706,910 B2 | | 4/2014 | Taylor et al. |
| 8,867,178 B2 | | 10/2014 | Ibusuki et al. |
| 9,035,999 B2 | | 5/2015 | Carpenter et al. |
| 9,456,131 B2 | | 9/2016 | Tran |
| 9,578,234 B2 | | 2/2017 | Tran |
| 2003/0026475 A1 | | 2/2003 | Yahashi et al. |
| 2005/0008240 A1 | | 1/2005 | Banerji et al. |
| 2006/0056708 A1 | | 3/2006 | Shen et al. |
| 2006/0101116 A1 | | 5/2006 | Rittman et al. |
| 2006/0250502 A1 | | 11/2006 | Tsao |
| 2006/0282855 A1 | * | 12/2006 | Margulis ............... G06F 3/1431 |
| | | | 725/43 |
| 2007/0187581 A1 | | 8/2007 | Ohmura et al. |
| 2007/0216363 A1 | | 9/2007 | Kawamoto et al. |
| 2008/0013613 A1 | | 1/2008 | Ahmad et al. |
| 2008/0080841 A1 | * | 4/2008 | Aso ...................... G11B 27/3036 |
| | | | 386/248 |
| 2008/0271072 A1 | | 10/2008 | Rothschild et al. |
| 2009/0016430 A1 | | 1/2009 | Schmit et al. |
| 2009/0060032 A1 | | 3/2009 | Schmit et al. |
| 2009/0125538 A1 | * | 5/2009 | Rosenzweig ....... G06F 15/8007 |
| 2009/0182986 A1 | * | 7/2009 | Schwinn ................. G06F 1/206 |
| | | | 712/214 |
| 2009/0199078 A1 | | 8/2009 | Caspi et al. |
| 2009/0207233 A1 | * | 8/2009 | Mauchly ................ H04N 7/144 |
| | | | 348/14.09 |
| 2009/0219411 A1 | | 9/2009 | Marman et al. |
| 2009/0219639 A1 | * | 9/2009 | Marman ................ H04N 5/772 |
| | | | 360/69 |
| 2010/0046005 A1 | | 2/2010 | Kalkowski et al. |
| 2010/0111489 A1 | | 5/2010 | Presler |
| 2010/0124279 A1 | | 5/2010 | Reddy |
| 2010/0128796 A1 | | 5/2010 | Choudhury |
| 2010/0166065 A1 | | 7/2010 | Perlman et al. |
| 2010/0235145 A1 | * | 9/2010 | Ascari ................... B25J 9/1612 |
| | | | 702/190 |
| 2010/0246668 A1 | | 9/2010 | Rintaluoma |
| 2010/0328493 A1 | | 12/2010 | Hanlon et al. |
| 2011/0058708 A1 | | 3/2011 | Ikenoue |
| 2011/0066673 A1 | * | 3/2011 | Outlaw ............... H04L 65/4092 |
| | | | 709/203 |
| 2011/0098056 A1 | * | 4/2011 | Rhoads ................. G01C 21/20 |
| | | | 455/456.1 |
| 2011/0113166 A1 | | 5/2011 | Hung et al. |
| 2011/0117787 A1 | | 5/2011 | Shu et al. |
| 2012/0271920 A1 | | 10/2012 | Isaksson |
| 2013/0142059 A1 | | 6/2013 | Di Girolamo et al. |
| 2018/0077380 A1 | | 3/2018 | Tran |

OTHER PUBLICATIONS

"Superspeed USB from the USB-IF," http://www.usb.org/developers/ssusb/, retrieved Jan. 22, 2019 from Internet Archive Wayback Machine (https://archive.org/), snapshot dated Feb. 8, 2010, 2 pages.

Notice of Allowance received for U.S. Appl. No. 15/727,392, dated May 22, 2019, 7 pages.

* cited by examiner

Obtain user preference for GPU encoder software on minimum resolution, quality of encode, speed of encode, CPU utilization, and power (810)

Start video capture and start GPU AVC encoding on CPU and GPU (812)

Detect power setting (814)

Loop

Sample CPU utilization (816)

If on a desktop set for high performance or laptop that is plugged in to AC (818)

If CPU utilization excluding video encoding tasks is below a predetermined threshold set by the max CPU utilization preference, encode at highest quality and speed while conforming to other user preference settings (820)

If CPU utilization excluding video encoding tasks is above the predetermined threshold, progressively decrease quality and/or speed of GPU encoding until user preference settings are met (822)

If CPU utilization excluding video encoding tasks is still above the predetermined threshold after decreasing quality/encoding speed, progressively decrease resolution until CPU utilization preference is met (824)

If CPU utilization excluding video encoding tasks is still above the predetermined threshold after decreasing quality/encoding speed/resolution, progressively decrease frame rate until CPU utilization preference is met (826)

If CPU utilization excluding video encoding tasks is still above the predetermined threshold after decreasing quality/encoding speed/resolution/frame rate, switch to voice conferencing mode (830)

Else if on a desktop that is set for low power or laptop that is not plugged in to AC (850)

Set preferences to medium resolution, medium quality encoding and other parameters optimized for battery life (868)

If CPU utilization excluding video encoding tasks is below a predetermined threshold set by the utilization preference, encode at the set quality and speed settings while conforming to other user preference settings (870)

If CPU utilization excluding video encoding tasks is above the predetermined threshold, progressively decrease quality and/or speed of GPU encoding until user preference settings are met (872)

If CPU utilization excluding video encoding tasks is still above the predetermined threshold after decreasing quality/encoding speed, progressively decrease resolution until CPU utilization preference is met (874)

If CPU utilization excluding video encoding tasks is still above the predetermined threshold after decreasing quality/encoding speed/resolution, progressively decrease frame rate until CPU utilization preference is met (876)

Until video capture is done

FIG. 10

SYSTEM AND METHOD(S) FOR PROCESSOR UTILIZATION-BASED ENCODING

This application is a continuation of Application Ser. No. 61/308,307 filed 26 Feb. 2010, Ser. No. 12/713,183, filed Feb. 26, 2010, Ser. No. 13/773,270 filed Feb. 21, 2013, Ser. No. 13/775,055, filed Feb. 22, 2013, and Ser. No. 14/147,575, the contents of which are incorporated by reference.

BACKGROUND

The present invention relates to a camera.

Advances in imaging technology have led to high resolution cameras for personal use as well as professional use. Personal uses include digital cameras and camcorders that can capture high quality images and videos. Professional uses include video conferencing systems and security cameras.

Video conferencing systems have rapidly evolved in capability. As more and more companies look for cost savings, high-tech solutions such as telepresence and video conferencing services are becoming more popular. Telepresence systems deliver lifelike, high-definition images and spatially discrete audio for immersive experiences using advanced visual, audio, and collaboration technologies.

Telepresence is an experience based on videoconferencing. Conventional telepresence systems are expensive as of 2010. Generally costing from $80 to $500K per system, systems creating a telepresence effect provide life-size images of the face and upper body of the remote participants while maintaining a position and proximity perspective that allows the remote participants to appear to be sitting on the other side of a conference-room table.

Another use of high resolution cameras is in video surveillance. The video surveillance equipment market includes CCTV cameras, Digital Video Recorders (DVRs) and Network Video Recorders (NVRs), and IP Encoder/Streamers. The transition from traditional CCTV surveillance to networked digital surveillance is revolutionary for the physical security industry. Network camera systems, for example network surveillance camera systems or IP camera systems, have existed for a number of years but have undergone relatively slow industry adoption. Compared to traditional analog camera systems, network camera systems offer advantages such as accessibility, integration, low installation costs, scalability, and an ability to move to higher resolution video. Data produced by network cameras, however, demand large amounts of bandwidth and storage capacity.

Typical storage architecture of network camera systems is configured similarly to traditional analog systems. The architecture includes centrally located digital video recorders (DVRs) or network video recorders (NVRs) connected through a network to IP cameras. The typical architecture is inadequate for a number of reasons. For example, most DVRs and NVRs do not include open platforms such that a system is limited to one brand for future replacements and upgrades. Also, most DVRs and NVRs do not meet IT standards for system resiliency, redundancy, and long-term archiving of video data. Additionally, typical network camera systems often lack storage scalability such that, as network camera systems expand, storage systems constantly need to be expanded.

Recently, some network camera systems have implemented video analytics processing to identify when important events (such as object movement) are being captured by a video camera. Video analytics has been primarily used to alert security of potential unwanted events. Most video analytics is performed by a central processor that is common to multiple cameras, but some video cameras have built-in video analytics capabilities. These video cameras with built-in analytics, however, have not included large capacity storage due to the large storage requirements of the video data generated by the camera. Also, there are some cameras configured without built-in video analytics but with built-in small storage capacity that is insufficient to serve as a substitute for traditional DVRs and NVRs.

As noted in United States Patent Application 20090219411, video analytics and a mass storage unit are contained in a camera housing of a video camera. The video analytics analyzes video data produced by the video camera and detects whether there is an occurrence of a defined event of interest. The video data representing the field of view of the scene observed by the video camera are stored in the mass storage unit.

SUMMARY

In one aspect, a camera includes a high definition (HD) imager with a central processing unit (CPU) or a graphic processing unit (GPU) including a plurality of processors therein; a wide area network (WAN) transceiver coupling the imager, the CPU or the GPU to a computer cloud with a cloud data storage device; and computer code executable by the processors in the GPU to encode and communicate an image or video to a cloud data storage device.

In another aspect, a video system includes a central processing unit (CPU) and a graphic processing unit (GPU) including a plurality of processors therein. The system includes a high definition (HD) imager; a serial bus controller coupled to the imager, the CPU and the GPU to communicate data between the HD imager and the CPU or the GPU over a serial bus having a transmit differential signal pair, a receive differential pair and a compatibility differential signal pair for interoperability with another serial bus version; and computer code executable by the processors in the GPU to encode in parallel the video transmitted over the serial bus controller and to minimize high definition encoding workload on the CPU.

In another aspect, a video system with a central processing unit (CPU) and a graphic processing unit (GPU) including a plurality of processors therein includes a high definition (HD) imager; an ultra-wideband (UWB) wireless transceiver coupling the imager, the CPU and the GPU; and computer code executable by the processors in the GPU to encode the video communicated using UWB.

In yet another aspect, a video system includes a high definition (HD) imager; a serial bus controller coupled to the imager, the CPU and the GPU to communicate data between the HD imager and the CPU or the GPU over a serial bus having a transmit differential signal pair, a receive differential pair and a compatibility differential signal pair for interoperability with a prior serial bus version; computer code executable by the processors in the GPU to encode the video transmitted over the serial bus controller; computer code executable by the GPU to stitch videos in real time from a plurality of cameras to provide at least a 180 degree view; and computer code executable by the CPU for high definition video conferencing or Skype video conferencing.

Implementations of the above aspects can include one or more of the following. The serial bus can be Super Speed Universal Serial Bus. The GPU performs Scalable Video Coding (SVC) or advanced video coding (AVC). The GPU performs one of: video analytics, encodes H.264 videos. The CPU can run code for high definition video conferencing or Skype video conferencing. A cloud based data storage can receive encoded video from the GPU. An elastic compute cloud can process the encoded video from the GPU. The GPU stitches videos in real time from a plurality of cameras to provide at least a 180 degree view. The code can conform to user preference on resolution, quality of encode, speed of encode, CPU utilization, or power. The system includes computer code to: if CPU utilization is below a predetermined threshold set by the CPU utilization preference, encode at highest quality or speed; if CPU utilization is above the predetermined threshold, progressively decrease quality or speed of encoding until user preference settings are met; and if CPU utilization is still above the predetermined threshold after decreasing quality or encoding speed, progressively decrease resolution until CPU utilization is below the predetermined threshold.

Advantages of the preferred embodiments may include one or more of the following. The network camera system produces high quality video data, requires less storage capacity and network bandwidth, meets IT standards, is easily scalable, and operates for a longer period of time without storage device replacement. The cloud based storage devices can be backed up and improve system reliability. Since video data is archived or stored redundantly, the system avoids the need to replace storage devices or other maintenance issue. The GPU can generate metadata with the video that can be made into content-aware video and stored in the cloud. The content-aware video data storage system includes video analytics that analyzes the content of the video data and local video data stores that store portions of the video data in response to the analysis by the vide analytics. Video data corresponding to the portions of video data are delivered through the network communication paths to the network video data stores to provide a managed amount of video data representing at a specified quality level the fields of view of the scenes. The managed amount of the video data consumes substantially less network bandwidth and fewer data storage resources than those which would be consumed by delivery to the network video stores the video data produced by the network video imaging devices at the specified quality level and in the absence of analysis by the video analytics. While video surveillance applications are of particular interest, the above approach is applicable across a wide variety of video applications.

Additional aspects and advantages will be apparent from the following detailed description of preferred embodiments, which proceeds with reference to the accompanying drawings.

BRIEF DESCRIPTION OF THE DRAWINGS

FIG. 2A shows an exemplary block diagram of a HD serial bus cam controller, while

FIG. 3A shows a perspective view of the plug or connector, while

FIG. 10 shows exemplary code to maintain CPU utilization preferences, among others.

DESCRIPTION OF PREFERRED EMBODIMENTS

Figure 1A:
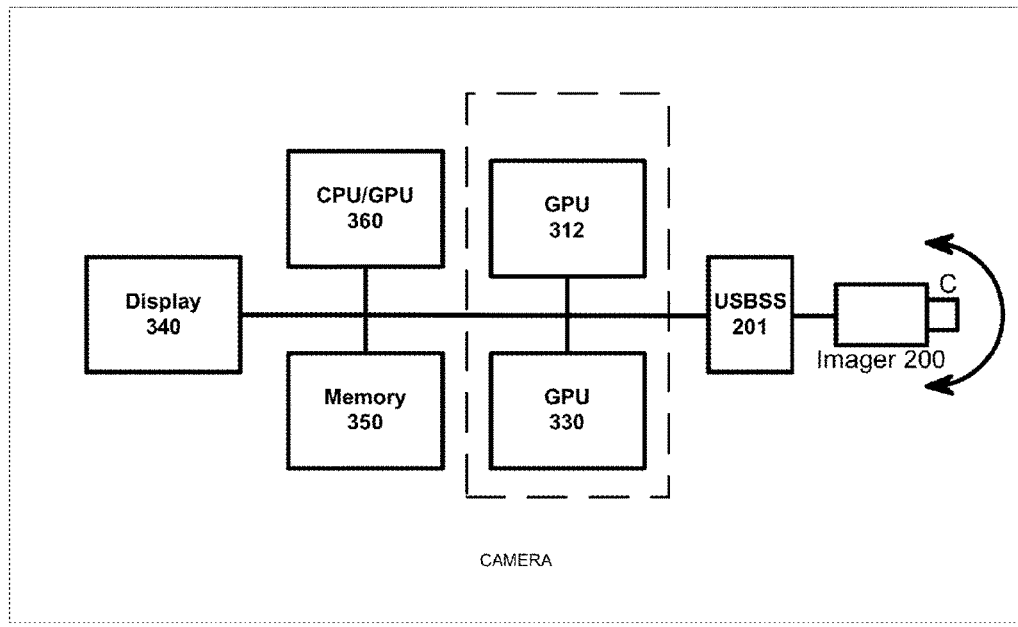
FIGS. 1A-1B show exemplary implementations of the HD serial bus camera.

System components with like reference numerals perform the same functions in each of the embodiments of a content aware storage system described below.

FIG. 1A shows one implementation of the HD serial bus camera. The output from imager (CMOS or CCD) 200 is digitized and provided to a CPU/GPU (graphic processing unit) device 360 where the parallel processes used to produce graphics imagery by the GPU are used instead to perform arithmetic calculations. Video data is transmitted over SuperSpeed USB or USB3.0 port 201 to the CPU bus such as PCIe bus and is provided to GPU code that handles video analytics and H.264 encoding. Additionally, one or more GPUs 312 and 330 can communicate with the CPU 360 over a bus such as PCIe bus to offload processing work from the CPU 360. The imager 200, the memory 350, and a display 340 can communicate over the bus as well. The GPUs, working in concert with the system's CPUs accelerate enabled applications beyond traditional graphics and video processing. This enables balanced platforms to run computationally-intensive tasks more efficiently, providing a better application experience to the end user, all at a virtually free cost since the GPU is already in the computer and no additional hardware is required.

Figure 1B:
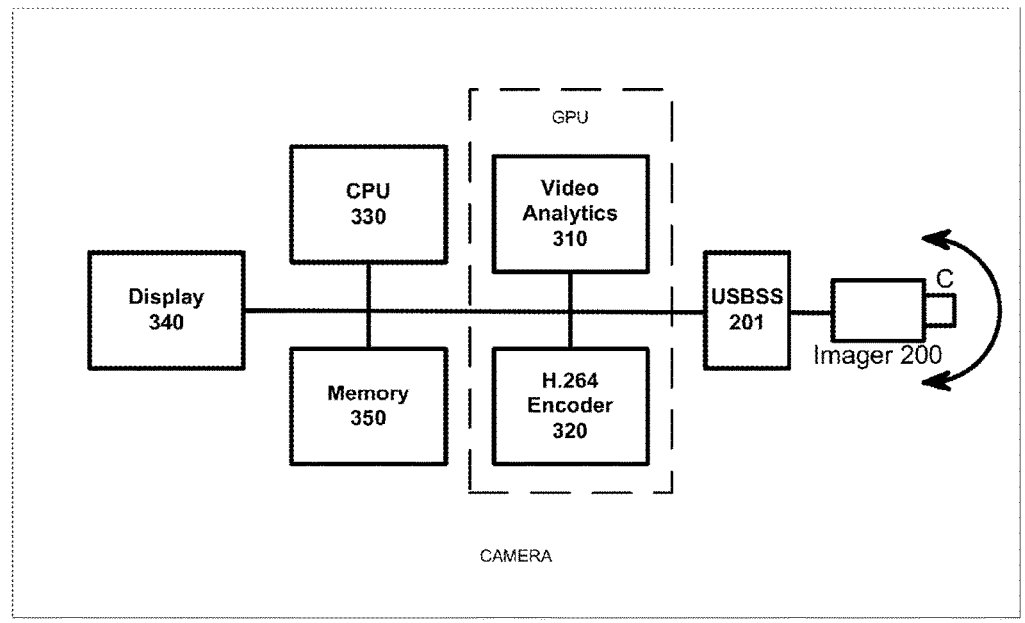

FIG. 1B shows another exemplary high definition serial bus camera. The output from imager (CMOS or CCD) 200 is digitized and the information is transmitted over SuperSpeed serial bus or USB3.0 port 201 to the CPU bus such as PCIe bus and is provided to an FPGA or ASIC device that has two portions: video analytics DSP 310 and H.264 encoder 320. The encoder 320 and a CPU 330 can share memory 350. The data can be transmitted over Ethernet and power can be supplied by the display 340. The system is cost effective and provides high performance. The FPGA version provides field upgradability. In one embodiment, the CPU 330, DSP 310 and encoder 320 are in one single ASIC. In another embodiment, the CPU 330 is a separate IC, while the DSP 310 and encoder 320 are in an FPGA. Any combinations of ASIC and FPGA can be done as well.

The system of FIG. 1A or 1B provides high performance and field upgradability. In one embodiment, the CPU and GPUs are in one single IC device with a heterogeneous multicore microprocessor architecture, combining a general purpose processing core(s) and basic graphics core(s) into one processor package, with different clocks for the graphics core and the central processing core. In this embodiment, AMD's Fusion series processor includes on-chip graphics core that can be changed without re-design of the whole core. In this embodiment, hardware decoders of MPEG2, VC-1 and H.264 video streams are included, while H.264 encoding is done on the GPUs with supported software. In another embodiment, the CPU 360 is a separate IC, while the GPUs are in a separate IC. Any combinations of CPU, GPU and FPGA can be done as well.

The implementation of FIG. 1A uses GPUs such as those in video cards from nVidia or ATI. The GPUs are designed to perform fast execution of integer and floating-point arithmetic. This capability enables the video adapter to quickly compute color, shading, texture, and other aspects of a changing image and render these in real time to the screen—thereby creating lifelike multimedia experiences. On many PCs, especially business PCs, much of this capability remains unused because business graphics only rarely need these full-bore advanced video capabilities, which means that the GPU and related hardware are available to be harnessed for non-video computation such as stream computing. Stream computing (or stream processing) refers to a class of compute problems, applications or tasks that can be broken down into parallel, identical operations and run simultaneously on a single processor device. These parallel data streams entering the processor device, computations taking place and the output from the device define stream computing. Stream computing takes advantage of a SIMD methodology (single instruction, multiple data) whereas a CPU is a modified SISD methodology (single instruction, single data); modifications taking various parallelism techniques into account. The benefit of stream computing stems from the highly parallel architecture of the GPU whereby tens to hundreds of parallel operations are performed with each clock cycle whereas the CPU can work only a small handful of parallel operations per clock cycle.

Figure 2A:
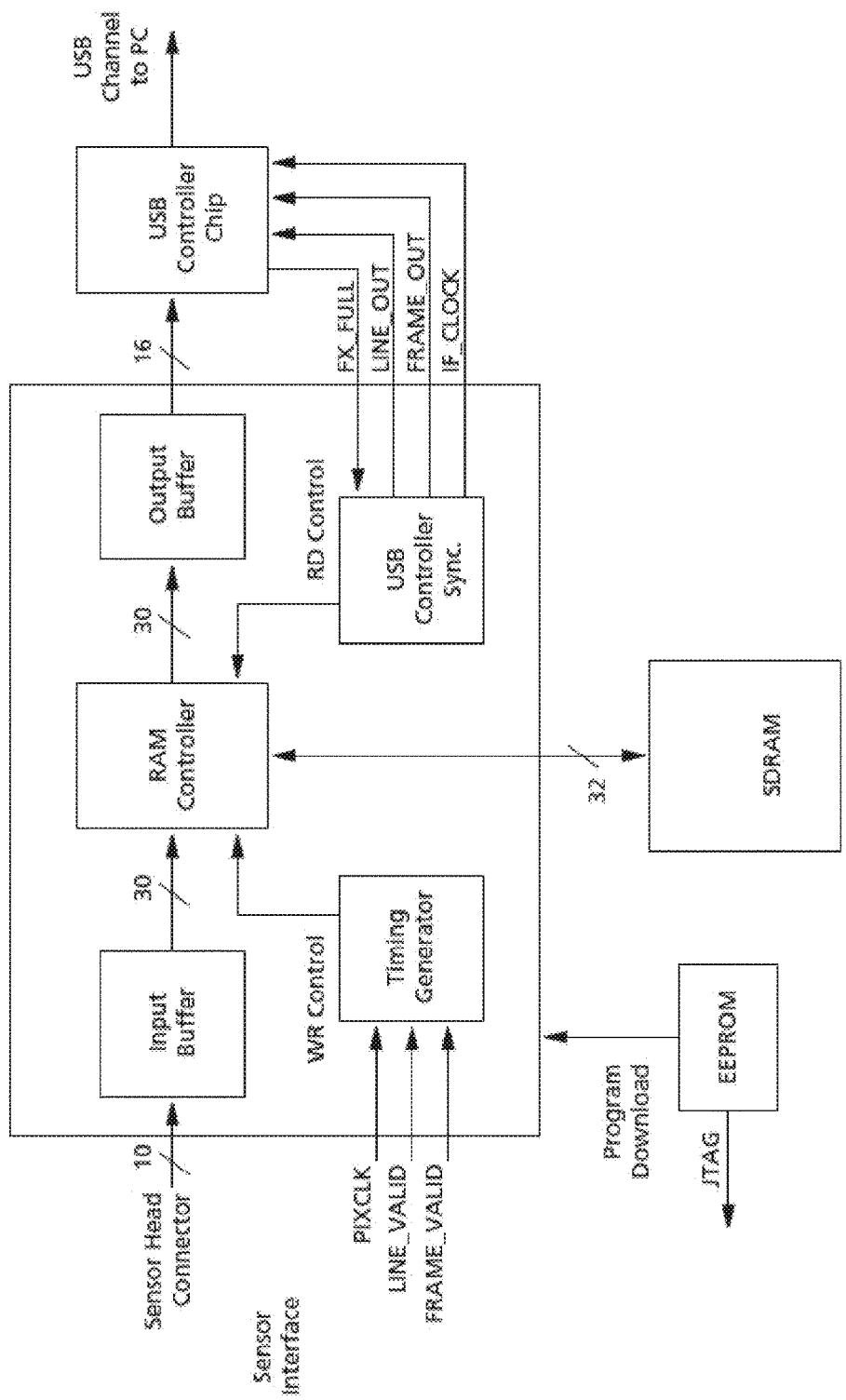

FIG. 2A shows an exemplary block diagram of a HD USB cam. The USB board provides centralized communication between the image sensor and the host PC. The system receives firmware programming from a serial EEPROM that configures the board into a synchronous slave FIFO mode. The sensor data fills up an internal FIFO with data when the elimination of handshake is taking place. The firmware automatically sends data through the USB 2.0 interface whenever the FIFO becomes full and the FRAME_VALID is polled to determine when a frame is complete. When the FRAME_VALID drops, the host computer is signaled through the USB interface with a frame end packet. The firmware also supplies the necessary code to implement USB vendor commands that allow the host computer to query and modify the system configuration data. Commands are used to communicate with the image sensor through the serial host interface protocol built into the sensor head interface. This embodiment works with Aptina/Micron's MT9P031, a ½.5-inch CMOS digital image sensor with an active-pixel array of 2592 H×1944V. It incorporates sophisticated camera functions such as windowing, binning, column and row skip mode, and snapshot mode. It is programmable through a simple two-wire serial interface.

The board of FIG. 2A can communicate over USB 3.0 protocol (SuperSpeed USB). The theoretical throughput improvement offered by USB 3.0 is a 10× jump over USB 2.0 hardware: USB 2.0 peaks at a theoretical 480 Mbps, while USB 3.0 can theoretically handle up to 5 Gbps. This is done using transmission over differential transceivers and shielded differential pair cables, the details of which can be found at http://www.usb.org/developers/ssusb/. Two differential pairs are used (dual/simplex), and the differential transmission is similar to those used in SATA and PCIe differential transmission techniques.

Figure 2B:
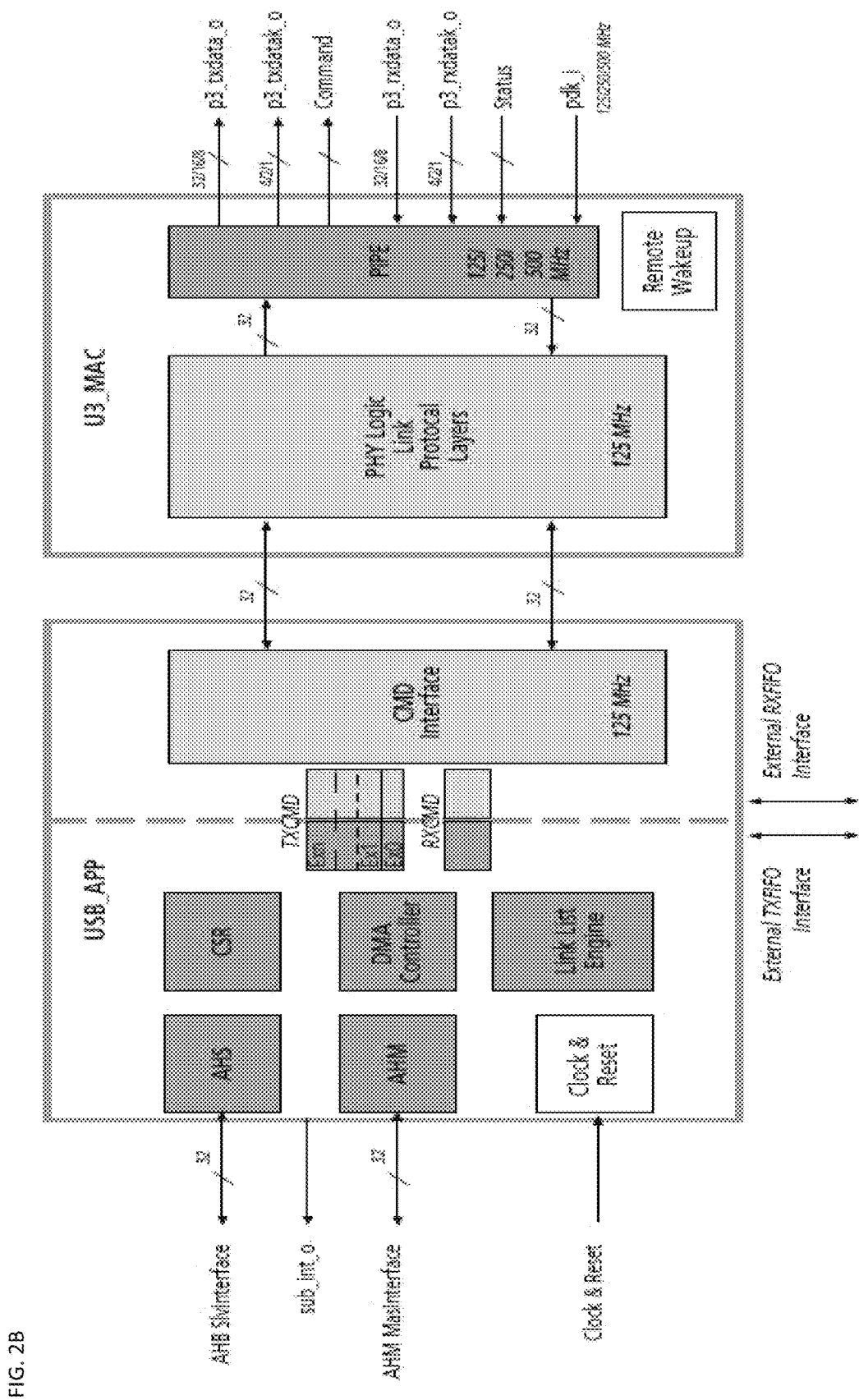
FIG. 2B shows a SuperSpeed controller and FIG. 2C shows a SuperSpeed PHY.

FIG. 2B shows an exemplary USB 3.0 SuperSpeed controller. This embodiment supports 8/16/32 bit USB 3.0 PIPE interface for discrete or integrated USB 3.0 PHY and 125/250/500 MHz PHY clock for 32/16/8 bit PIPE interfaces. The PHY interface supports data scrambling to reduce EMI emissions. The controller has a link linker that communicates with a protocol layer. The protocol layer can communicate with a buffer manager, which in turn communicates with a DMA engine.

Figure 2C:
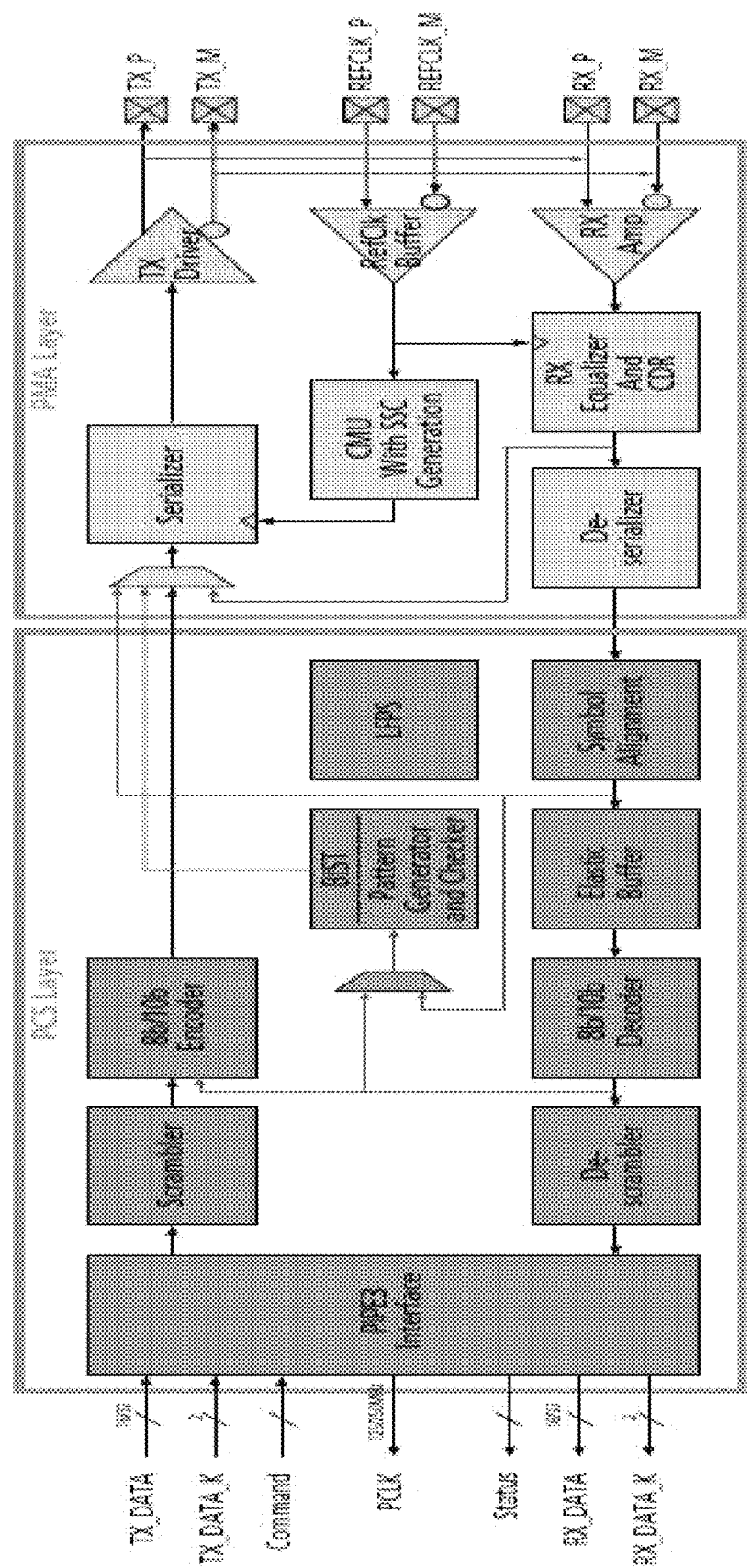

FIG. 2C shows an exemplary USB3.0 PHY. The PHY is compliant with Universal Serial Bus 3.0 electrical interface specification. A digital wrapper implements Intel PIPE Specification for USB simplifying integration. Automatic digital calibration of key analog circuits is done to ensure reliability. Digitally-programmable receive equalization is included to mitigate the harmful effects of ISI. A fractional synthesis supports spread-spectrum clocking required by USB 3.0. All USB 3.0 power saving modes (U0, U1, U2, and U3) are supported for ultra-low power operation.

Figure 3A:
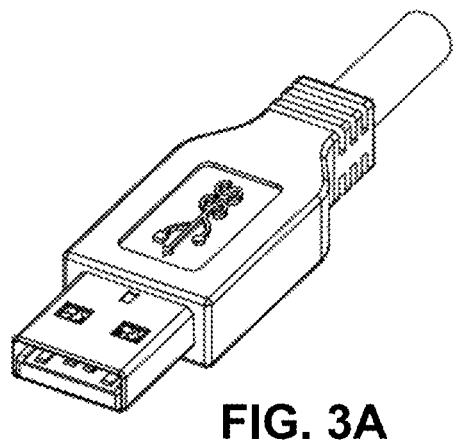
Figure 3B:
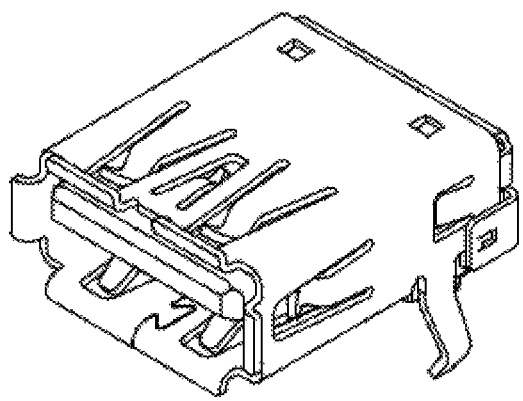
FIG. 3B shows the metal shell and FIG. 3C shows the connector pins.
Figure 3C:
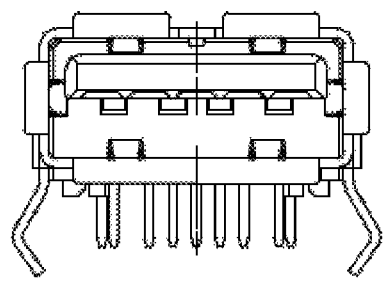

The cameras in FIGS. 1A-1B and 6-7 can communicate over PCIe bus, or can communicate over USB 3.0 protocol (SuperSpeed USB). The device can theoretically handle up to 5 Gbps. This is done using transmission over differential transceivers and shielded differential pair cables, the details of which can be found at http:www.usb.org/developers/ssusb/. Two differential pairs are used (dual/simplex), and the differential transmission is similar to those used in SATA and PCIe differential transmission techniques. FIGS. 3A-3C shows an exemplary connector used to connect the camera to the processor bus in FIGS. 1A-1B. FIG. 3A shows a perspective view of the plug or connector, while FIG. 3B shows the metal shell and FIG. 3C shows the connector pins.

Figure 4A:
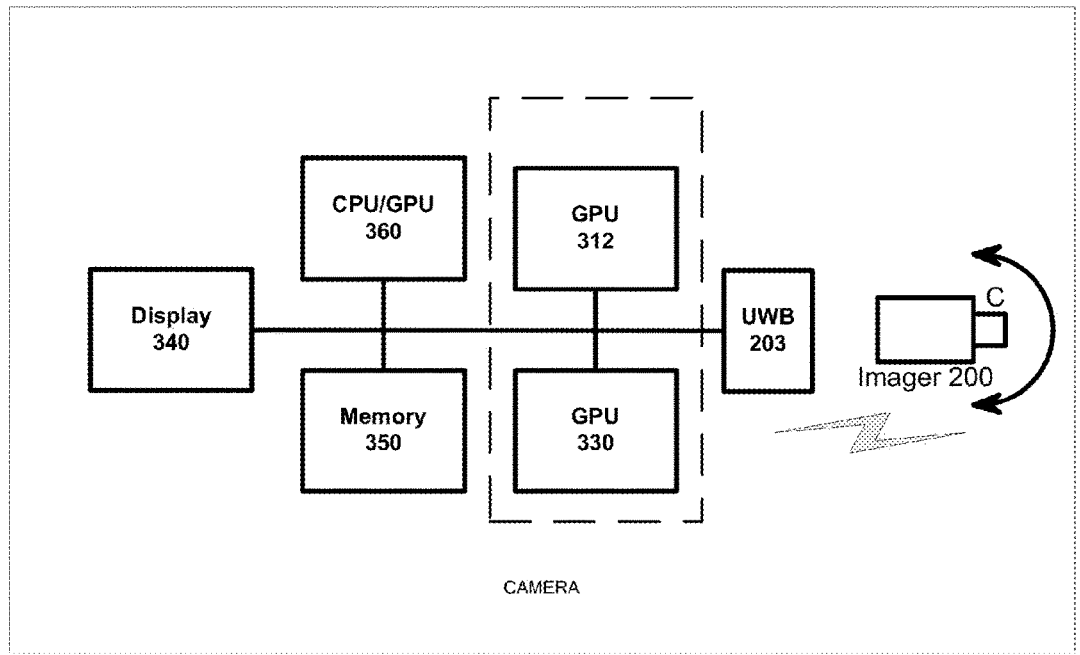
FIG. 4A-4B shows exemplary video analysis systems.
Figure 4B:
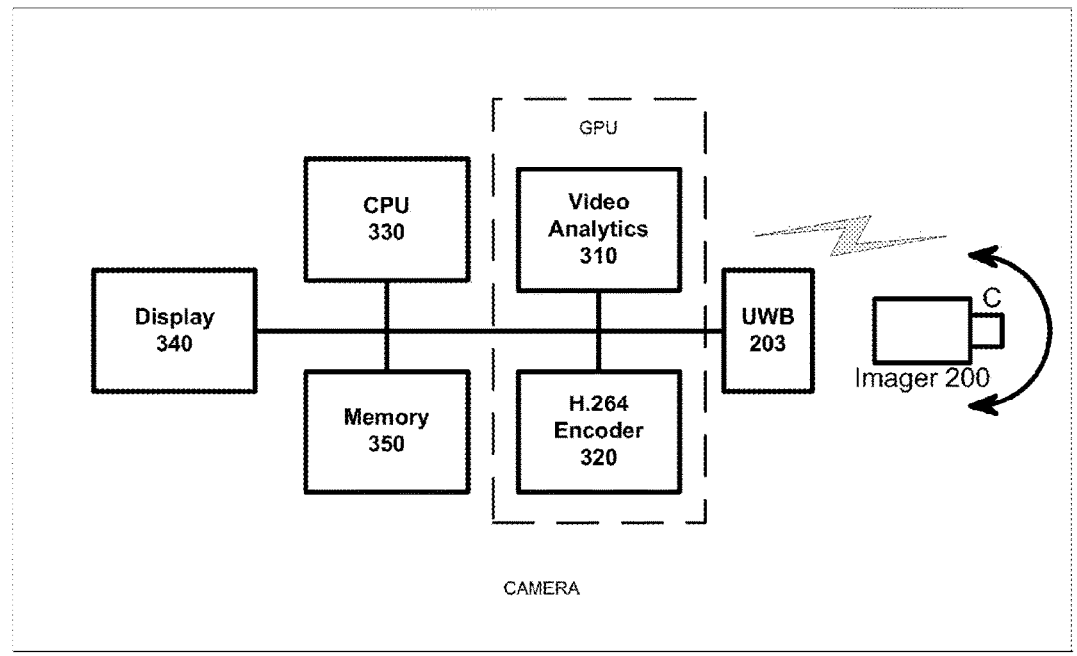

FIGS. 4A and 4B are similar to FIGS. 1A and 1B, but in place of the USB3.0 connector, these embodiments have ultra-wideband (UWB) transceiver 203 that communicate with corresponding UWB transceivers on a remote imager 200. In one embodiment, the transceiver 203 is a UWB chip set from TZero Technologies. TZero uses the WiMedia flavor of UWB that's based on an OFDM channel. The consumer can more conveniently locate the camera and PC with a wireless link. The TZero-based system includes multiple camera HDMI inputs and legacy component HD inputs. Thus, the embodiment also functions as an HDMI switch connecting multiple HD sources over the single wireless link.

Figure 5:
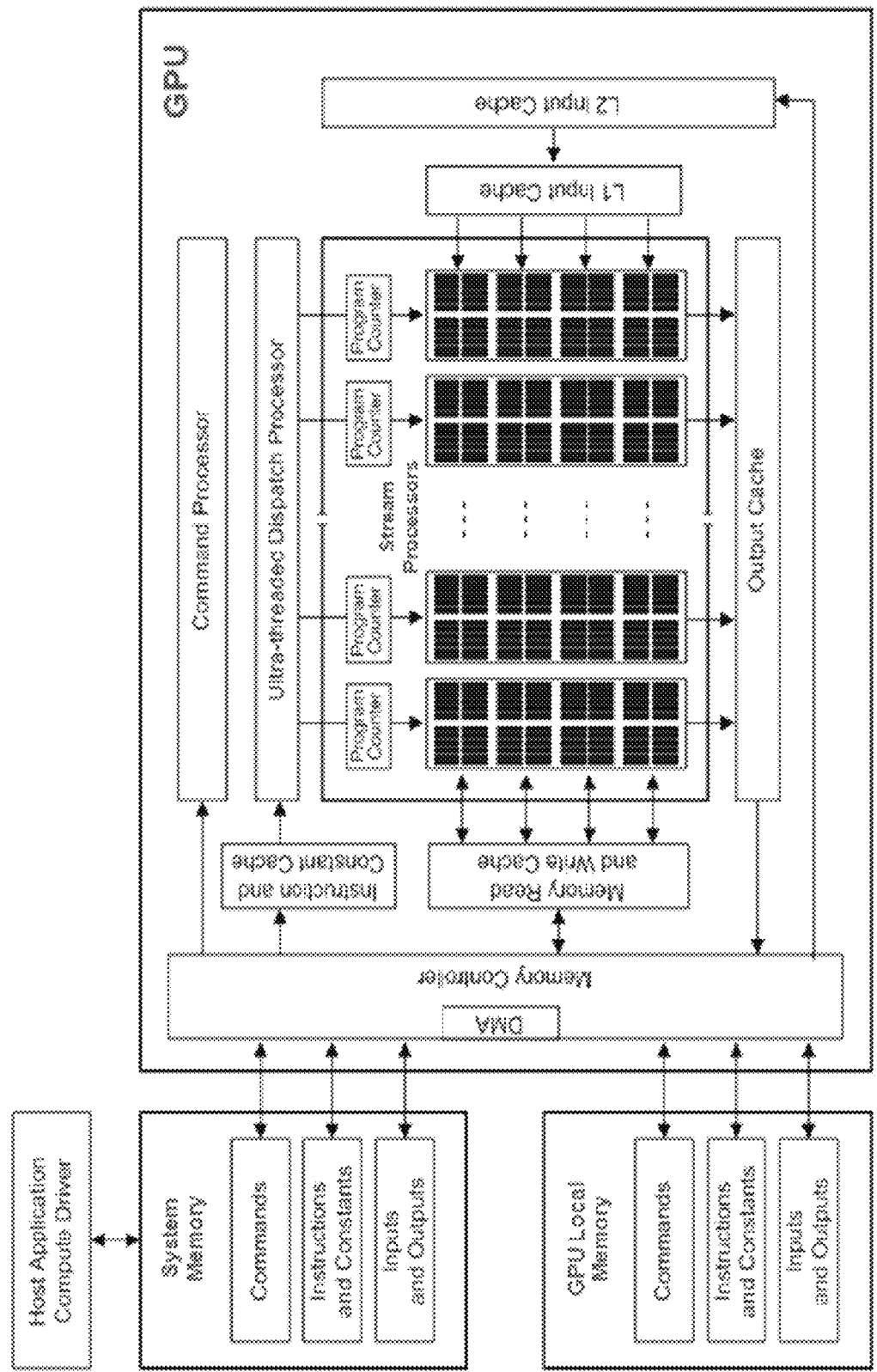
FIG. 5 shows details of an exemplary GPU.
Figure 6:
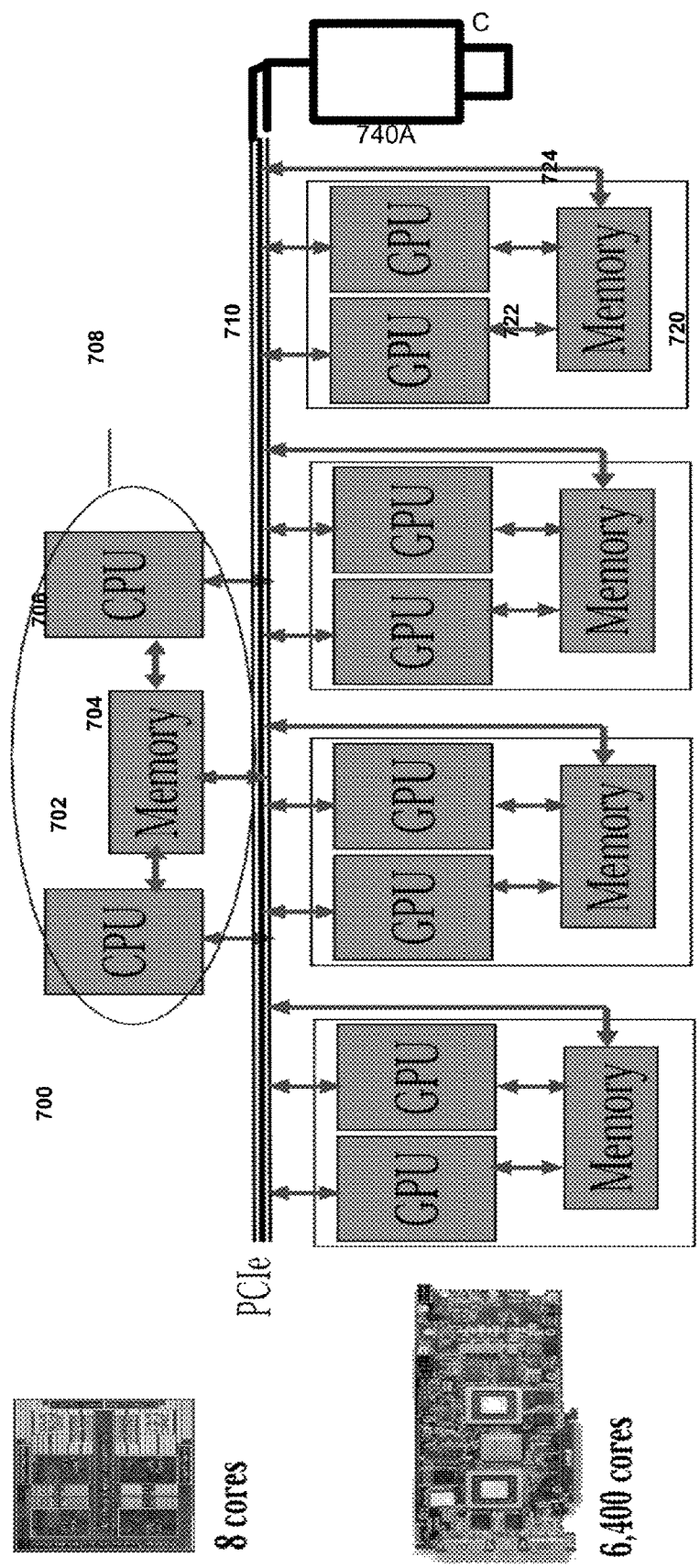
FIGS. 6-7 shows two embodiment of GPU based camera.

FIG. 5 shows details of an exemplary GPU from AMD/ATI. FIG. 6 shows one embodiment of GPU based camera 700. In FIG. 6, a multi-core processor 708 includes CPUs 702 and 706 with shared memory 704. The processor 708 communicates over a PCIe bus 710 with one or more graphics chips 720 which includes a plurality of GPUs 722 communicating with shared memory 724. A camera 740A also communicates over the PCIe bus 710.

Figure 7:
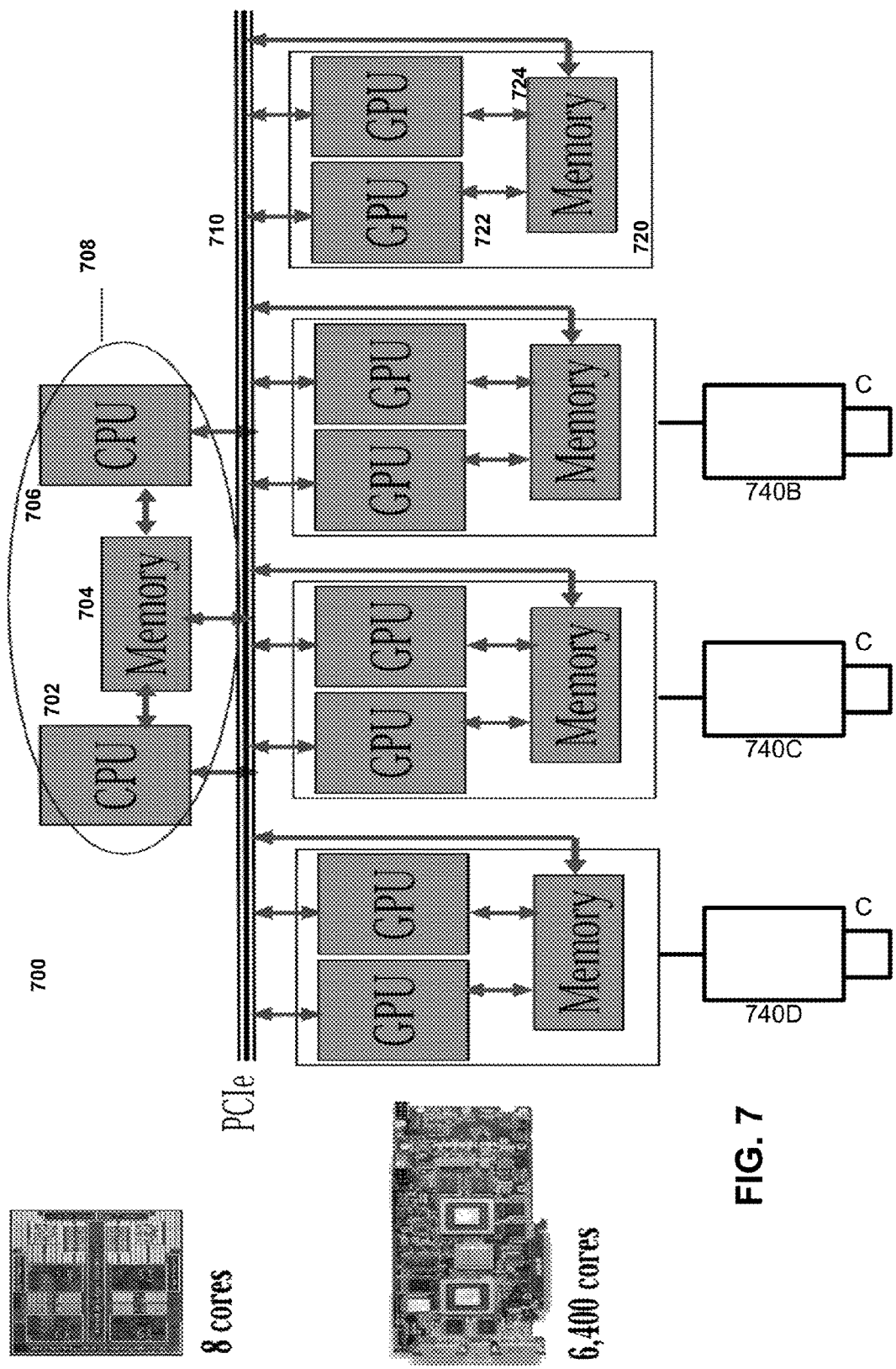

FIG. 7 shows another GPU camera embodiment of FIG. 6. In this embodiment, each of three cameras 740B, 740C and 740D is connected to a GPU device and the GPU device 720 in turn performs video analytics and/or encoder operations on the video captured by the camera. The system of FIG. 7 scalably handles a number of cameras in parallel, while keeping overhead costs low.

Figure 8:
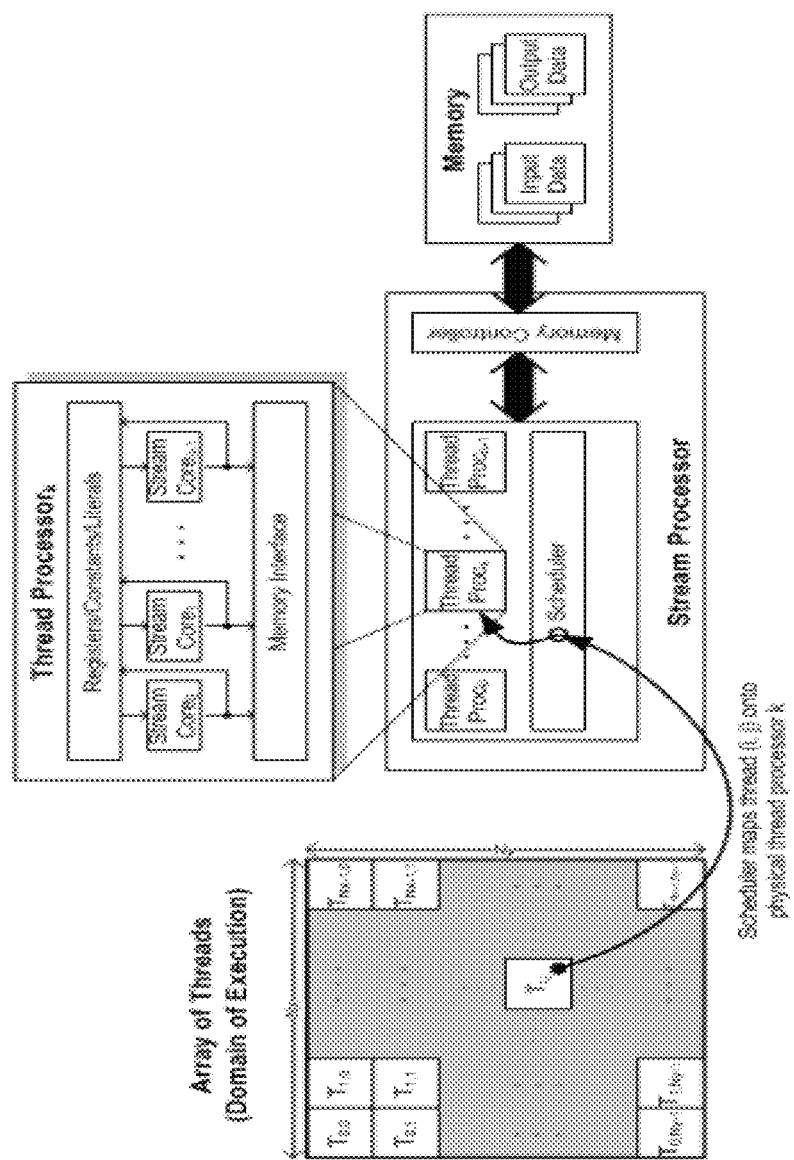
FIG. 8 shows an exemplary stream computing programming model.

FIG. 8 shows an exemplary stream computing programming model where programmable stream cores execute application specific programs called stream kernels such as video processing kernels. The stream cores operate with a virtualized SIMD programming model operating on streams of data. In stream computing, arrays of input video data are mapped onto a number of SIMD engines which execute kernels to generate video outputs that are written to external memory or to the cloud. Each instance of a kernel is called a thread. A specified region of the output buffer to which threads are mapped is the domain of execution. The stream processor schedules the array of threads onto a group of processors until all threads have been processed. Subsequent kernels can be executed until the application completes.

Figure 9:
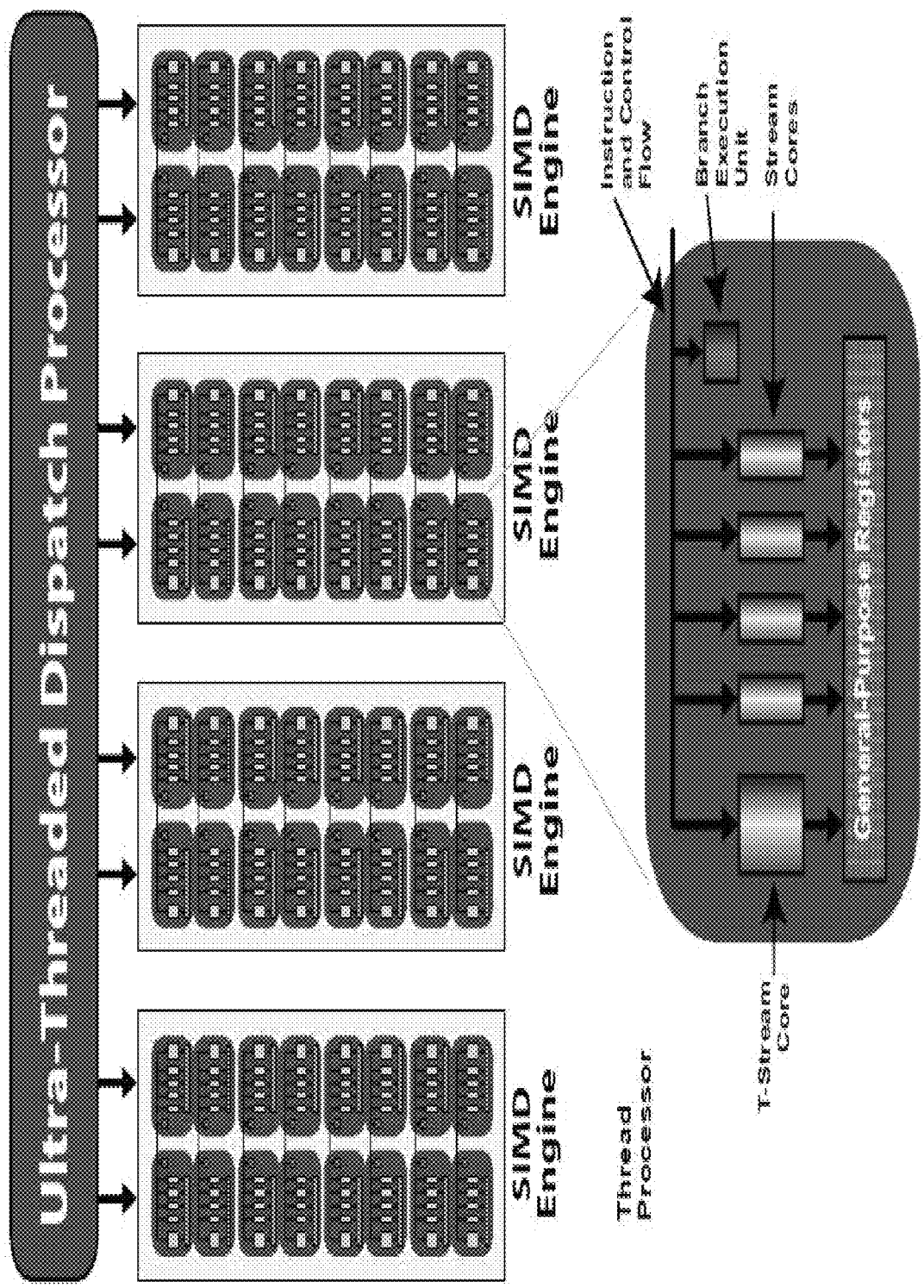
FIG. 9 shows exemplary stream processor which includes groups of SIMD engines.

FIG. 9 shows exemplary stream processor which includes groups of SIMD engines. Each SIMD engine contains numerous thread processors, which are responsible for executing kernels, each operating on an independent data stream. Thread processors in turn contain numerous stream cores, which are programmable computation units that can perform integer, single or double precision floating point and transcendental operations. All thread processors within an SIMD engine execute the same instruction, and different SIMD engines can execute different instructions.

In one embodiment, the GPUs are used to expedite the motion estimation function, which is the most computationally intensive section of H.264 operations by performing motion estimation in parallel. The term "parallel" to refer to processes that generally run concurrently in a coordinated fashion, but does not require a strict step by step, or clock by clock parallelism.

The GPU executes parallel instructions that form a video analytic engine. The video analytics engine analyzes the video data produced by imager 200 to detect whether a predefined event or object of interest is being captured by imager which captures high definition video. Video analytics engine generates metadata that describe the content of video data. The metadata produced by video analytics engine may be a textual and semantic description of the content of the video. Video analytics engines of different cameras may have different analytic capabilities. Multiple events of interest may be defined, and more than one event of interest may occur at a particular time. Also, the nonoccurrence of one event leaves open the possibility of the occurrence of a second event. The metadata may be supplied to data storage system or the Amazon S3 web storage. The metadata representing an arbitrary frame n can be associated with video data representing frame n. Thus, the metadata may be searchable to allow a user to efficiently search and semantically browse large video archives.

An event of interest that video analytics engine detects may be as simple as motion in the field of view. Video analytics engine may also implement blob detection (e.g. detecting a group of moving pixels as a potential moving object, without identifying what type of object it is), lighting change adjustment, and geometric calibration based on object size in the field of view to distinguish objects based on types. For example, video analytics engine may be able to classify an object as a human being, a vehicle, or another type of object and be able to recognize an object when the object appears in any portion within the field of view of camera. Furthermore, video analytics engine may be able to recognize certain identifiable features of an object such as, for example, human faces and vehicle license plates. Video analytics engine may be able to recognize when imager 200 is capturing a new object and assign a unique object ID to the new object. Video analytics engine may be able to recognize the speed and trajectory at which an object moves. Video analytics engine may be able to recognize events such as perimeter intrusion, object movement in a particular direction, objects approaching one another, a number of objects located in a specified area, objects left behind, and object removal. Video analytics engine can also recognize specific locations, or coordinates, within the field of view where an event or object of interest is being captured, or a combination of objects and events, as defined by a rule.

When video analytics engine detects an event or object of interest within the video data, video analytics engine generates metadata that correspond to the event or object of interest and supplies the metadata to an action engine, which can be rules based in one embodiment. For example, the rules can send an alert (e.g., instructions to generate one or both of a visual display and an audible sound) to central monitoring station or remote user, store video data in Amazon S3 for X period of time, among others. For example, a user may define the following rule: when a human being enters a defined perimeter, store high resolution video data representing the intrusion, alert central monitoring station of the intrusion, generate a short video clip of the intrusion and send the video clip to central monitoring station, and store in the Web storage S3 the video data representing the intrusion. Or, a user may define the following rule: when no event or object of interest is being captured, store low resolution video data and send no video data to central monitoring station. Because video analytics engine can detect various objects and events, a wide variety of rules may be defined by a user and each rule can have different storage quality settings. Also, because multiple events of interest may occur simultaneously, a rule may correspond to a combination of events.

The GPUs can also perform video compression. The video compression engine can be a scalable video codec to generate multiple quality levels using H.264 SVC. In operation, imager 200 captures a field of view and generates video data. Frames of the video data are time-stamped so that metadata generated by video analytics engine may be synchronized with video data generated by imager. Video analytics engine analyzes the video data generated by imager 200 and generates metadata based upon the content of the video data. The video compression engine also receives the video data generated by imager 200 and generates scalable video data that can be subsequently be saved at differing resolution. The metadata is communicated to the server to determine whether a rule has been violated (i.e., whether an event or object of interest detected by video analytics engine requires action).

Referring now to exemplary H.264 encoder cores, the initial step is the generation of a prediction. The baseline H.264 encoder uses two kinds of prediction: intra prediction (generated from pixels already encoded in the current frame) and inter prediction (generated from pixels encoded in the previous frames).

A residual is then calculated by performing the difference between the current block and the prediction. The prediction selected is the one that minimizes the energy of the residual in an optimization process that is quite computationally intensive.

A linear transform is then applied to the residual. Two linear transforms are used: Hadamard and a transform derived from the discrete cosine transform (DCT). The coefficients resulting from the transformations are then quantized, and subsequently encoded into Network Abstraction Layer (NAL) units. These NALs include context information—such as the type of prediction—that is required to reconstruct the pixel data. The NAL units represent the output of the baseline H.264 encoding process.

Meanwhile, inverse quantization and transform are applied to the quantized coefficients. The result is added to the prediction, and a macroblock is reconstructed. An optional deblocking filter is applied to the reconstructed macroblocks to reduce compression artifacts in the output. The reconstructed macroblock is stored for use in future intra prediction and inter prediction. Intra prediction is generated from unfiltered reconstructed macroblocks, while inter prediction is generated from reconstructed macroblocks that are filtered or unfiltered.

Intra prediction is formed from pixels that were previously encoded. Two kinds of intra predictions are used: intra16×16 and intra4×4. In intra16×16, all the pixels already encoded at the boundary with the current block can be used to generate a prediction. These are shown shaded in the figure below. The core can generate the four modes of the intra16×16 prediction. In intra4×4, 16 4×4 blocks of prediction are generated from the pixels at the boundaries of each 4×4 prediction block and boundary pixels are used in intra 16×16 and intra4×4 intra prediction modes.

The inter prediction is generated from motion estimation. At the heart of video compression, motion estimation is used to exploit the temporal redundancy present in natural video sequences. Motion estimation is performed by searching for a 16×16 area of pixels in a previously encoded frame so that the energy of the residual (difference) between the current block and the selected area is minimized.

The core can search an area 32×32 pixels wide, down to ¼ pixel of resolution (−16.00, +15.75 in both X and Y direction). Pixels at ¼ resolution are generated with a complex interpolation filter described in the ITU-T H.264 specification.

The Hadamard transform and an integer transform derived from the DCT and their descriptions can be found in the ITU-T H.264 standard, the content of which is incorporated by reference. Both transforms (and their inverse functions) can be performed by using only additions, subtractions and shift operations. Both quantization and its inverse are also relatively simple and are implemented with multiplication and shifts.

H.264 encoding can be essentially divided into two independent processes: motion estimation and compensation, and variable length encoding. The motion estimation submodule of the core consists of two stages: integer pixel motion estimation followed by a refining step that searches for matches down to ¼ pixel resolution. The integer search unit utilizes a 4 step search and sums of absolute difference (SAD) process to estimate the motion vector. Similar to the case of motion estimation, SADs are used to search for the intra prediction mode that best matches the current block of pixels.

The resultant bitstream is assembled into NAL units and output in byte stream format as specified in Annex B of the ITU-T H.264 specification. Each NAL unit contains context information about the type of prediction, motion vectors, Quantisation Parameter delta, and the Context Adaptive Variable Length Coded (CAVLC) luma and chroma coefficients. Most of the encoded bits in each macroblock are devoted to the CAVLC coefficients. CAVLC coding operates on 4×4 blocks and scans the coefficients in zig-zag order. Each 4×4 block comprises the following elements:
the number of non-zero coefficients
number of trailing ones (up to 3)
sign of each trailing one (up to 3)
the level code of each non-zero coefficient
the zero run code preceding each non-zero coefficient For high definition video, the core requires an external memory, whose interface can be easily interfaced to the AMBA AHB with a minimal amount of extra logic. The interface is also designed to be tolerant of latencies and delays typical of a shared bus. The external memory is likely to be, in many cases, a type of SDRAM rather than SRAM. One of the characteristics of SDRAM is for the memory to behave essentially like a SRAM provided that accesses are confined within a page. Only when crossing a page boundary will the penalty of extra cycles be incurred due to a precharge. Therefore the core sorts all its memory accesses in a way that minimizes page boundary crossings, achieving performance closer to one that would be obtained if it was connected to SRAM. The memory controller can postpone precharging as long as accesses are confined to the same page. Additionally, the external memory interface can be clocked at a different frequency from the main core. Other features include block skipping for lower bit count and multiple slice encoding for error resilience. A deblocking filter is also used in order to improve image quality at low bit rates.

The GPU can also implement a Cellular Neural Network (CNN) suitable for image processing. Cellular arrays are usually defined on a spatially discrete square (rectangular) grid; however, hexagonal and triangular arrangements can also be considered. These grids are the only regular contiguous tessellations of the plain based on congruent polygons alone. Other grid-types can also be created based on non-regular congruent polygons or from a regular vertex grid through discrete geometrical transformations: rotations and translations. A number of these grids can be mapped on a typical eight-neighbor rectangular structure with periodic space-variant connections. The CNN has a mixer which contains cell values for the next updates, a memory unit that contains a belt of the cell array, a template memory, and an arithmetic unit. The processors can be connected on a grid. Depending on the template size, each mixer unit stores the surrounding cells of the currently processed one, while the memory units store a one or two row-high belt from the given layer. Using this structure the I/O requirements of the processor are reduced to p load and p store operations per cell update. The optimized template memory contains only the parameters which are necessary to perform the computations, while the modified arithmetic units make efficient computation of the different type multilayer dynamics possible.

Advanced Video Coding (AVC)

In one embodiment, a video frame is broken down into macroblocks (each macroblock typically covers 16×16 pixels), each macroblock's movement from a previous frame (reference frame) is tracked and represented as a vector, called motion vector. Storing this vector and residual information instead of the complete pixel information greatly reduces the amount of data used to store the video. The pyramid (or hierarchical) motion vector prediction performs motion estimation on a significant downsampled version of the image. The vectors found in this iteration are used as estimates for the motion vector predictions in motion estimation of a slightly less-downsampled image. This process is repeated until the motion estimation is performed on the full-resolution image. One implementation started at a level of sixteen times downsampling and doubled the resolution to eight times. It continued doubling until the motion estimation is done for the full resolution image. One kernel is executed per level of hierarchy. After the kernel was done executing the motion vectors found are left on the device for the next kernel call to minimize the number of host-device memory transfers needed.

In another implementation, the GPUs operates in parallel on "slices" of video data for H.264 encoding, each containing a set of blocks that can be decoded without any other neighboring block information (from outside the slice). At each slice, the predictors are reset, trading off compression efficiency for error resilience. Thus, one slice can be used per line of blocks. If an error is introduced in any given block, the system can recover on the next line of blocks.

The video frames are first placed in to the memory from a capture device such as a camera. The GPU then executes various pixel processes of an encoder resulting in coefficients. These processes include Intra and Inter prediction, mode selection, motion estimation, motion compensation, DCT and IDCT, Quantization and inverse Quantization. The resulting coefficients and metadata is then processed by GPU. The GPU then takes the coefficient and meta data and encodes using a variable length coding process (VLC)

resulting in a video stream. If there are multiple slices in the picture, the GPU can process each slice in parallel resulting in higher overall performance.

Each slice in a video stream can be decoded independently of other slices. Slices also contain blocks that are dependent on other blocks in the slice and are best decoded sequentially; therefore, in a preferred embodiment, each slice is decoded using a sequential processor in the GPU, but more than one slice can be decoded in parallel using a group of sequential processors in the GPU. Each sequential processor decodes an assigned slice, and outputs the independent coefficients and metadata into another array for subsequent use. If there are not enough sequential processors for all slices of a frame, slices may be assigned, for example in a round-robin fashion, until all slices are decoded.

Variable sized slices are packed in a buffer that contains the encoded bits from the video stream with all slices packed together. The data is pre-processed by finding the point in the buffer where each slice begins and the pointers for each slice are stored in an index array which is read by each processor in the GPU to find the location of the slice that each processor is responsible for decoding. Once the set of macroblocks in each GPU processor array has been VLC decoded to coefficients and meta data, the resulting (RLE compressed) coefficients and metadata for each block in a slice is stored in an array. Another index table is used to indicate where each macroblock is located in the coefficient buffer. Each processor in the GPU array then reads the address offset for the macroblock data for its decoding assignment. Once all the slices have been decoded, the decompressed slice data is sent for H.264 NAC assembly and decoding of the next frame of slices can be started on the GPU array. Since each macroblock is independent of other macroblocks, the GPU's parallel processors can be applied to decompressing all of the blocks in parallel.

The system allows H.264 to be encoded/decoded without noticeably slowing the user's other tasks. Since users prefer to be able to use their computers while conferencing, the system avoids consuming all of the CPU in the encode/decode task in such a way that the user can't do anything else on his or her computer besides encoding.

FIG. 10 shows an exemplary process to optimize the speed of encode and CPU utilization. The metrics of success for GPU encoding can be measured on a plurality of axes: resolution, quality of encode, speed of encode, CPU utilization, and power. The code run by the GPU is modifiable to optimize on a given axis. Pseudo code of this optimization is as follows:

Obtain user preference for GPU encoder software on minimum resolution, quality of encode, speed of encode, CPU utilization, and power (810)
Start video capture and start GPU AVC encoding on CPU and GPU (812)
Detect power setting (814)
Loop
  Sample CPU utilization (816)
  If on a desktop set for high performance or laptop that is plugged in to AC (818)
    If CPU utilization excluding video encoding tasks is below a predetermined threshold set by the max CPU utilization preference, encode at highest quality and speed while conforming to other user preference settings (820)
    If CPU utilization excluding video encoding tasks is above the predetermined threshold, progressively decrease quality and/or speed of GPU encoding until user preference settings are met (822)
    If CPU utilization excluding video encoding tasks is still above the predetermined threshold after decreasing quality/encoding speed, progressively decrease resolution until CPU utilization preference is met (824)
    If CPU utilization excluding video encoding tasks is still above the predetermined threshold after decreasing quality/encoding speed/resolution, progressively decrease frame rate until CPU utilization preference is met (826)
    If CPU utilization excluding video encoding tasks is still above the predetermined threshold after decreasing quality/encoding speed/resolution/frame rate, switch to voice conferencing mode (830)
  Else if on a desktop that is set for low power or laptop that is not plugged in to AC (850)
    Set preferences to medium resolution, medium quality encoding and other parameters optimized for battery life (868)
    If CPU utilization excluding video encoding tasks is below a predetermined threshold set by the utilization preference, encode at the set quality and speed settings while conforming to other user preference settings (870)
    If CPU utilization excluding video encoding tasks is above the predetermined threshold, progressively decrease quality and/or speed of GPU encoding until user preference settings are met (872)
    If CPU utilization excluding video encoding tasks is still above the predetermined threshold after decreasing quality/encoding speed, progressively decrease resolution until CPU utilization preference is met (874)
    If CPU utilization excluding video encoding tasks is still above the predetermined threshold after decreasing quality/encoding speed/resolution, progressively decrease frame rate until CPU utilization preference is met (876)
Until video capture is done A CPU can't encode faster if it is maxed out. Once processor utilization exceeds a predetermined level, the system inserts sleep states in the GPU based encoder to achieve real time high quality encoding but at a desired CPU utilization.

One embodiment also performs scalable video coding using the GPU. Other embodiments can perform various high level operations as described below.

Face Recognition

Face detection can be performed on board the camera for autofocus of the camera. Additionally, the face detection can be used to identify regions in the video that should be encoded at high resolution for certain applications.

A parallelized implementation of convolutional neural networks (CNNs) is done with parallelizing the detection process using the GPU. The convolutional network consists of a set of layers each of which contains one or more planes. Approximately centered and normalized images enter at the input layer. Each unit in a plane receives input from a small neighborhood in the planes of the previous layer. The idea of connecting units to local receptive fields dates back to the 1960s with the perceptron and Hubel and Wiesel's discovery of locally sensitive, orientation-selective neurons in the cat's visual system. The general strategy of a convolutional network is to extract simple features at a higher resolution, and then convert them into more complex features at a coarser resolution. The simplest was to generate coarser resolution is to sub-sample a layer by a factor of 2. This, in turn, is a clue to the convolutions kernel's size.

The weights forming the receptive field for a plane are forced to be equal at all points in the plane. Each plane can be considered as a feature map which has a fixed feature detector that is convolved with a local window which is scanned over the planes in the previous layer. Multiple planes are usually used in each layer so that multiple features can be detected. These layers are called convolutional layers.

The GPU supports a fast, automatic system for face recognition which is a combination of a local image sample representation, a self-organizing map network, and a convolutional network for face recognition. For the images in the training set, a fixed size window is stepped over the entire image and local image samples are extracted at each step. At each step the window is moved by 4 pixels. Next, a self-organizing map (e.g. with three dimensions and five nodes per dimension) is trained on the vectors from the previous stage. The SOM quantizes the 25-dimensional input vectors into 125 topologically ordered values. The three dimensions of the SOM can be thought of as three features. The SOM can be replaced with the Karhunen-Loeve transform. The KL transform projects the vectors in the 25-dimensional space into a 3-dimensional space. Next, the same window as in the first step is stepped over all of the images in the training and test sets. The local image samples are passed through the SOM at each step, thereby creating new training and test sets in the output space created by the self-organizing map. (Each input image is now represented by 3 maps, each of which corresponds to a dimension in the SOM. The size of these maps is equal to the size of the input image divided by the step size. A convolutional neural network, or alternatively a multilayer perceptron neural network, is trained on the newly created training set.

The self-organizing map provides a quantization of the image samples into a topological space where inputs that are nearby in the original space are also nearby in the output space, which results in invariance to minor changes in the image samples, and the convolutional neural network provides for partial invariance to translation, rotation, scale, and deformation. Substitution of the Karhunen-Lo'eve transform for the self organizing map produced similar but slightly worse results. The method is capable of rapid classification, requires only fast, approximate normalization and preprocessing, and consistently exhibits better classification performance than the eigenfaces approach on the database considered as the number of images per person in the training database is varied from 1 to 5.

Face Detection/Gesture Detection

As discussed above, a parallelized implementation of convolutional neural networks (CNNs) is done with parallelizing the detection process using the GPU. This can be used for autofocus of the camera. Once the face is detected, the GPUs can also be used to detect gestures as commands. Motion features are first computed on the input image sequence (stationary camera assumed). The face detector is then employed to obtain a user-centric representation, and again a classifier to discriminate between gestures is learned using a variant of AdaBoost. A real-time version of this classifier is deployed using the GPU.

To calculate the motion features, the optical flow for each frame is determined. The optical flow vector field F is then split into horizontal and vertical components of the flow, Fx and Fy, each of which is then half-wave rectified into four non-negative channels Fx+, Fx−, Fy+, Fy−. A channel corresponding to motion magnitude F0 is obtained by computing the L2 norm of the four basic channels. These five non-negative channels are then normalized to facilitate gesture recognition in soft-real time where frame rates can be variable, and to account for different speed of motion by different users.

Given a vector v that represents the optical flow for a given pixel, the system computes $v=v/(\|v\|+e)$, where e is used to squash optical flow vectors with very small magnitude introduced by noise. Next, each of the five channels is box-filtered to reduce sensitivity to small translations by the user performing the gesture. This final set of five channels: $\hat{F}x+, \hat{F}x-, \hat{F}y+, \hat{F}y-, \hat{F}0$ will be used as the motion features for each frame.

A gesture is represented as a collection of movements required to complete a single phase of the gesture, rather than just capture a subset of the gesture phase. Hence, the system aggregates the motion features over a temporal history of the last k frames, for some k which is large enough to capture all frames from a gesture phase.

Face detection is used to create a normalized, user centric view of the user. The image is scaled based on the radius of the detected face, and is then cropped and centered based on the position of the face. The frame is cropped and resized to a 50×50 pixel region centered around the user. All five motion feature channels described above are flattened into a single vector which will be used to determine the gesture being performed.

A multi-class boosting process Ada Boost is used such as the one at http://multiboost.sourceforge.net. Ada Boost takes the motion features as input. The supervised training is based on a set of labeled gestures. A set of weak learners is generated based on thresholding value from a particular component of the motion feature vector. The output of the final strong learner on motion feature v for class label is determined using weights chosen by Ada Boost.

Video Conferencing Compression

In one embodiment, the video feature tracking and matching described above is used to compress conferencing sessions. Typically, in videoconferencing, the background remains the same, but the facial expression can change. The operation is as follows:

1) send the first few minutes of video using conventional or compressed video and simultaneously determine predetermine facial and body features;

2) after the start up period, for each frame determine whether the current frame only has facial/body changes and if so look for an updated position of the features and transmit a vector indicating facial and body feature changes to the remote computer the remote computer converts the vector of changed facial features to an image of the user's face and body position 3) otherwise, there are significant changes to the frame and so loop back to (1) to do a fresh compression cycle.

The process achieves a very high compression ratio since only a vector of feature position changes are sent as a vector and the vector is converted back into frame image by the remote computer. Moreover, if significant scene changes occur (such as new participants entering the conference, or participant picks up a book and show book to the camera), then the system reverts back to H.264 compression of full image.

Panaroma Stitching

Figure 11:
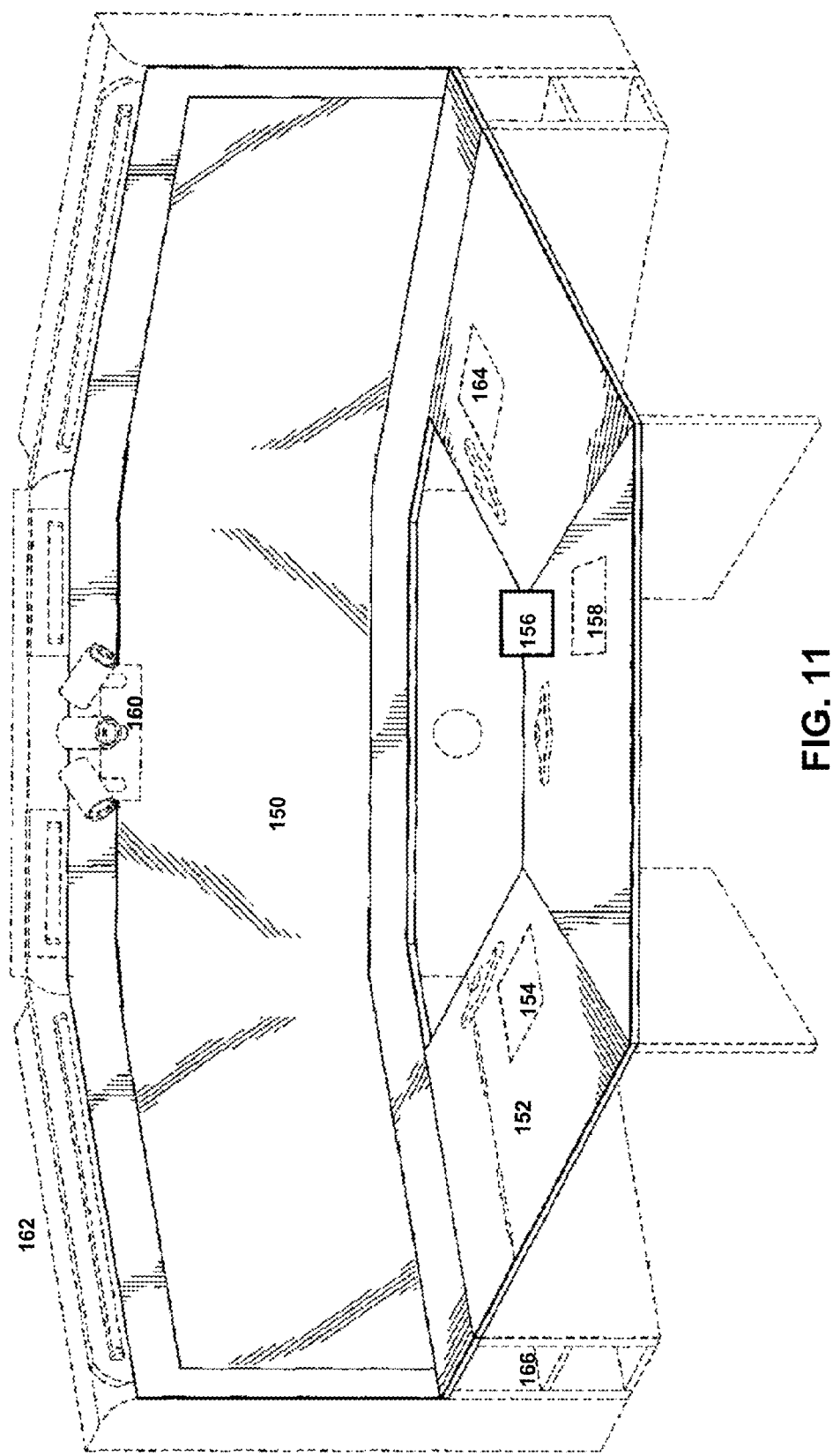
FIG. 11 shows an exemplary immersive video conferencing system.

Referring back to the telepresence video conferencing system of FIG. 11, the GPUs can perform panaroma stitching so that 3 inexpensive cameras can be used to provide a 180 degree immersive view. The GPU operations are done pipeline fashion as follows: Radial Distortion Correction. Next, the GPUs perform Keypoint Detection & Extraction (Shi-Tomasi/SIFT). Keypoint Matching is done, and the GPUs recover Homography (RANSAC). Next, the GPUs create a Laplacian Pyramid. A Projective Transform is done, and a Multi-Band Blend is the last stage of the pipeline.

Immersive Conferencing

FIG. 11 shows an exemplary telepresence conferencing system using one or more of the HD USB cameras. The system has a wide field display 150 that provides viewers with an immersive 180 degree view of participants on the other side of the call. A wide view camera 160 captures a 180 degree view of participants and transmits such video to the other side of the conference call. The wide view camera 160 can be one camera fitted with wide angle lens and suitable distortion removing image processor, or can be three separate camera each capturing left, center and right views, respectively. The system can have optional lights 162 to provide lighting to provide high quality images of the physical participants. In one embodiment, the system has desks with a series of surfaces 152 that form an oval physical table space while the display 150 shows the virtual participants. In another embodiment, the system has desks with a series of surfaces 152 that form a semicircular physical table space while the display 150 shows the virtual participants and a matching virtual table space that mirrors the semicircular physical table. The surface 152 includes computers 154, 158 and 164 such as laptop computers. The table also includes an LCD control panel 156 that allows users to control and operate the conferencing system.

In one embodiment, the conferencing system includes a 3D scanner 166. The scanner allows the participants to share 3D shape information with others. The 3D scanner 166 transmits 3D shape data that can be displayed on the display 150 and manipulated using suitable 3D imaging or CAD programs. The purpose of a 3D scanner is usually to create a point cloud of geometric samples on the surface of the subject. These points can then be used to extrapolate the shape of the subject (a process called reconstruction). If color information is collected at each point, then the colors on the surface of the subject can also be determined. Like cameras, they have a cone-like field of view, and like cameras, they can only collect information about surfaces that are not obscured. While a camera collects color information about surfaces within its field of view, 3D scanners collect distance information about surfaces within its field of view. The "picture" produced by a 3D scanner describes the distance to a surface at each point in the picture. Together with distance, which corresponds to the r component, these spherical coordinates fully describe the three dimensional position of each point in the picture, in a local coordinate system relative to the scanner.

Also, more details on the 3D scanner are discussed next. The system can work with a variety of 3D scanners to communicate shape information with remote conferencing participants. The two types of 3D scanners are contact and non-contact. Non-contact 3D scanners can be further divided into two main categories, active scanners and passive scanners. There are a variety of technologies that fall under each of these categories. Contact 3D scanners probe the subject through physical touch. A CMM (coordinate measuring machine) is an example of a contact 3D scanner. It is used mostly in manufacturing and can be very precise. The disadvantage of CMMs though, is that it requires contact with the object being scanned. Thus, the act of scanning the object might modify or damage it. This fact is very significant when scanning delicate or valuable objects such as historical artifacts. The other disadvantage of CMMs is that they are relatively slow compared to the other scanning methods. Physically moving the arm that the probe is mounted on can be very slow and the fastest CMMs can only operate on a few hundred hertz. In contrast, an optical system like a laser scanner can operate from 10 to 500 kHz. Non-contact scanners can be active scanners that emit radiation or light and detect its reflection in order to probe an object or environment. Possible types of emissions used include light, ultrasound or x-ray. A time-of-flight lidar scanner may be used to scan buildings, rock formations, etc., to produce a 3D model. The lidar can aim its laser beam in a wide range: its head rotates horizontally, a mirror flips vertically. The laser beam is used to measure the distance to the first object on its path. The time-of-flight 3D laser scanner is an active scanner that uses laser light to probe the subject. At the heart of this type of scanner is a time-of-flight laser rangefinder. The laser rangefinder finds the distance of a surface by timing the round-trip time of a pulse of light. A laser is used to emit a pulse of light and the amount of time before the reflected light is seen by a detector is timed. Since the speed of light c is a known, the round-trip time determines the travel distance of the light, which is twice the distance between the scanner and the surface. The laser rangefinder only detects the distance of one point in its direction of view. Thus, the scanner scans its entire field of view one point at a time by changing the range finder's direction of view to scan different points. The view direction of the laser rangefinder can be changed either by rotating the range finder itself, or by using a system of rotating mirrors. The latter method is commonly used because mirrors are much lighter and can thus be rotated much faster and with greater accuracy. Typical time-of-flight 3D laser scanners can measure the distance of 10,000~100,000 points every second. A triangulation 3D laser scanner is also an active scanner that uses laser light to probe the environment. With respect to time-of-flight 3D laser scanner the triangulation laser shines a laser on the subject and exploits a camera to look for the location of the laser dot. Depending on how far away the laser strikes a surface, the laser dot appears at different places in the camera's field of view. This technique is called triangulation because the laser dot, the camera and the laser emitter form a triangle. The length of one side of the triangle, the distance between the camera and the laser emitter is known. The angle of the laser emitter corner is also known. The angle of the camera corner can be determined by looking at the location of the laser dot in the camera's field of view. These three pieces of information fully determine the shape and size of the triangle and gives the location of the laser dot corner of the triangle. In most cases a laser stripe, instead of a single laser dot, is swept across the object to speed up the acquisition process. In a Conoscopic system, a laser beam is projected onto the surface and then the immediate reflection along the same ray-path are put through a conoscopic crystal and projected onto a CCD. The result is a diffraction pattern, that can be frequency analyzed to determine the distance to the measured surface. The main advantage with Conoscopic Holography is that only a single ray-path is needed for measuring, thus giving an opportunity to measure for instance the depth of a finely drilled hole. Structured-light 3D scanners project a pattern of light on the subject and look at the deformation of the pattern on the subject. The pattern may be one dimensional or two dimensional. An example of a one dimensional pattern is a line. The line is projected onto the subject using either an LCD projector or a sweeping laser. A camera, offset slightly from the pattern projector, looks at the shape of the line and uses a technique similar to triangulation to calculate the distance of every point on the line. In the case of a single-line pattern, the line is swept across the field of view to gather distance information one strip at a time. Modulated light 3D scanners shine a continually changing light at the subject. Usually the light source simply cycles its amplitude in a sinusoidal pattern. A camera detects the reflected light and the amount the pattern is shifted by determines the distance the light traveled. Modulated light also allows the scanner to ignore light from sources other than a laser, so there is no interference. Photometric systems usually use a single camera, but take multiple images under varying lighting conditions. These techniques attempt to invert the image formation model in order to recover the surface orientation at each pixel. This sort of 3D scanning is based on the principles of photogrammetry. It is also somewhat similar in methodology to panoramic photography, except that the photos are taken of one object on a three-dimensional space in order to replicate it instead of taking a series of photos from one point in a three-dimensional space in order to replicate the surrounding environment. Alternatively, computed tomography, microtomography, magnetic resonance imaging (MRI) techniques can be used in the 3D scanner.

In addition, a rapid prototyping machine can be installed to render the 3D data into a physical model for the participants to touch and feel. Rapid prototyping is the automatic construction of physical objects using additive manufacturing technology. The first techniques for rapid prototyping became available in the late 1980s and were used to produce models and prototype parts. Today, they are used for a much wider range of applications and are even used to manufacture production-quality parts in relatively small numbers. The use of additive manufacturing technology for rapid prototyping takes virtual designs from computer aided design (CAD) or animation modeling software, transforms them into thin, virtual, horizontal cross-sections and then creates successive layers until the model is complete.

Cloud Based Parallel Video Storage and Search Engine

Preferably the video data can be operated in parallel using clusters of cloud based processors. Video analysis applications from anywhere in the world can, after authentication and security clearance, access and analyze video data that represents video streams in parallel, and annotate portions of the video data (e.g., frames and groups of frames), based on the analyses performed, with information that describes the portion of the video data. From an event stored in the database, the associated frames and/or groups of frames can be replayed for further human-based or application-based analyses.

Applications plugged into the pipeline, via application program interfaces (APIs), can perform complex analyses and update the search engine in parallel.

The camera, through the network, can store data on a storage cloud such as Amazon's S3 cloud service. The network also includes an elastic compute cloud (EC2) that enables the camera system process the video data and the system can increase or decrease video processing capacity within minutes, not hours or days. The system can commission one, hundreds or even thousands of server instances simultaneously to perform deep searching of images to locate a particular individual captured by the cameras, for example. The system can select a configuration of memory, CPU, instance storage, and the boot partition size that is optimal for its choice of operating system and application. The compute cloud offers a highly reliable environment where replacement processor instances can be rapidly and predictably commissioned. The Amazon embodiment runs within Amazon's proven network infrastructure and datacenters and Amazon EC2's Service Level Agreement commitment is 99.95% availability for each Amazon EC2 Region. Moreover, on-Demand Instances let security camera users or operators pay for compute capacity by the hour with no long-term commitments. This frees the system operator from the costs and complexities of planning, purchasing, and maintaining hardware and transforms what are commonly large fixed costs into much smaller variable costs. On-Demand Instances also remove the need to buy "safety net" capacity to handle periodic traffic spikes. Other features such as Auto Scaling allow the camera system 100 to automatically scale its Amazon EC2 capacity up or down according to predefined conditions. With Auto Scaling, the system can ensure that the number of Amazon EC2 instances needed scales up seamlessly during demand spikes to maintain storage size or video analytic performance, and scales down automatically during demand lulls to minimize costs. Auto Scaling is particularly well suited for security monitoring applications that experience hourly, daily, or weekly variability in usage. The EC2 also provides Elastic Load Balancing, which automatically distributes incoming application traffic across multiple Amazon EC2 instances. It enables the system to achieve even greater fault tolerance in video processing, seamlessly providing the amount of load balancing capacity needed in response to incoming camera video traffic. Elastic Load Balancing detects unhealthy instances within a pool and automatically reroutes traffic to healthy instances until the unhealthy instances have been restored. Using the plurality of PCs on the EC2 cloud, each processing application can run in parallel to enhance searching and indexing of videos.

Although parallel video searching is described above, alternatively, the cloud based processors can be configured as a sequential processing systems where video analysis applications can access and analyze video data that represents video streams flowing through the pipeline, and annotate portions of the video data (e.g., frames and groups of frames), based on the analyses performed, with information that describes the portion of the video data. These annotations flow through the pipeline, possibly along with corresponding frames or groups of frames, to subsequent stages of processing, at which increasingly complex analyses can be performed. Analyses performed at the various stages of the pipeline can take advantage of the analyses performed at prior stages of the pipeline through use of the information embodied in the annotations. At each stage of the pipeline, portions of the video streams determined to be of no interest to subsequent stages are removed from the video data, which reduces the processing requirements of the subsequent stages.

From an event stored in the database, the associated frames and/or groups of frames can be replayed for further human-based or application-based analyses. Generally, as the videos flow down the pipeline, (1) portions of the videos or frames that are considered uninteresting to all the applications at a given stage are removed, thereby reducing the amount of data that flows further down the pipeline; (2) portions of the videos or frames that are considered interesting to an application at a given stage are analyzed, with a goal of identifying features, activities, objects, etc. of interest; and (3) analyzed portions of the videos or frames are annotated by the applications with information that describes what the applications identified as interesting in that portion of the video. In one embodiment, the pipeline comprises four different successive stages of processing: (1) quick frame processing; (2) deep frame processing; (3)

cluster processing; and (4) database processing. Due to the nature of the pipeline, applications plugged into the pipeline, via application program interfaces (APIs) associated with each respective stage, can perform increasingly more complex analyses at each successive stage of processing. Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

What is claimed is:

1. A method comprising:
   encoding, at a computing device, a first portion of video data at a first video quality level;
   sending the encoded first portion of the video data via a network to a second computing device;
   determining a utilization level of a central processing unit (CPU) of the computing device;
   encoding, based on the utilization level, a second portion of the video data at a second video quality level that is less than the first video quality level;
   sending the encoded second portion of the video data via the network to the second computing device;
   determining a second utilization level of the CPU after encoding the second portion of the video data, the second utilization level greater than the utilization level; and
   encoding, based on the second utilization level, a third portion of the video data, the third portion of the video data including audio but not video.

2. The method of claim 1, wherein the encoded first portion of the video data is in high definition (HD).

3. The method of claim 1, wherein the second portion of the video data is encoded at the second video quality level based on the utilization level failing to satisfy a threshold.

4. A method comprising:
   encoding, at a computing device, a first portion of video data at a first video resolution;
   sending the encoded first portion of the video data via a network to a second computing device;
   determining a utilization level of a central processing unit (CPU) of the computing device;
   encoding, based on the utilization level, a second portion of the video data at a second video resolution that is greater than the first video resolution;
   sending the encoded second portion of the video data via the network to the second computing device;
   determining a second utilization level of the CPU after encoding the second portion of the video data, the second utilization level greater than the utilization level; and
   encoding, based on the second utilization level, a third portion of the video data, the third portion of the video data including audio but not video.

5. The method of claim 4, wherein the encoded second portion of the video data is in high resolution (HD).

6. The method of claim 4, further comprising determining whether the computing device receives power from an electrical outlet, wherein the second portion of the video data is encoded at the second video resolution based further on the computing device receiving power from the electrical outlet.

7. A method comprising:
   generating, at a computing device, multimedia data including video and audio, the multimedia data corresponding to video conferencing;
   determining a first utilization level of a processor of the computing device;
   encoding, at the computing device, a first portion of the multimedia data, the first portion of the multimedia data including video and audio;
   sending the encoded first portion of the multimedia data via a network to a second computing device;
   determining a second utilization level of the processor of the computing device, the second utilization level greater than the first utilization level;
   encoding, based on the second utilization level, a second portion of the multimedia data, the second portion of the multimedia data including audio but not video;
   sending the encoded second portion of the multimedia data via the network to the second computing device;
   determining a third utilization level of the processor of the computing device, the third utilization level less than the second utilization level;
   encoding, based on the third utilization level, a third portion of the multimedia data, the third portion of the multimedia data including video and audio; and
   sending the encoded third portion of the multimedia data via the network to the second computing device.

* * * * *